US008656150B2

(12) United States Patent (10) Patent No.: US 8,656,150 B2
Huang et al. (45) Date of Patent: Feb. 18, 2014

(54) COMPUTER SYSTEM WITH OVERCLOCKING FUNCTION INVOLVES SETTING TIME PARAMETER OF MEMORY CONTROLLER

(75) Inventors: Ren-Jiun Huang, Taipei (TW); Ben-Jen Lu, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 645 days.

(21) Appl. No.: 12/978,829

(22) Filed: Dec. 27, 2010

(65) Prior Publication Data

US 2011/0161706 A1 Jun. 30, 2011

(30) Foreign Application Priority Data

Dec. 28, 2009 (TW) ................................ 98145338 A

(51) Int. Cl.
*G06F 9/00* (2006.01)
*G06F 1/04* (2006.01)
(52) U.S. Cl.
USPC .......................................... 713/100; 713/600
(58) Field of Classification Search
USPC .................................. 713/100, 322, 500, 600
See application file for complete search history.

(56) References Cited

U.S. PATENT DOCUMENTS

| 7,382,366 | B1 * | 6/2008 | Klock et al. | 345/213 |
|---|---|---|---|---|
| 7,500,122 | B2 * | 3/2009 | Won et al. | 713/320 |
| 7,549,073 | B2 * | 6/2009 | Kuo et al. | 713/500 |
| 8,274,271 | B2 * | 9/2012 | Wu et al. | 323/322 |
| 2009/0235108 | A1 * | 9/2009 | Gold et al. | 713/500 |
| 2009/0265575 | A1 * | 10/2009 | Chen | 713/600 |

FOREIGN PATENT DOCUMENTS

| TW | I313806 | 8/2009 |
|---|---|---|
| TW | 200943044 | 10/2009 |
| TW | 200944996 | 11/2009 |

* cited by examiner

*Primary Examiner* — Chun Cao
(74) *Attorney, Agent, or Firm* — Jiang Chyun IP Office

(57) ABSTRACT

An overclocking method applied to a computer system includes the following steps: setting a first operating voltage and a first clock rate; generating a first control signal to a power supply and generating a second control signal to a clock generator according to the first operating voltage and the first clock rate, respectively; controlling the computer system into a sleep mode; resuming the computer system from the sleep mode after a predetermined time; restarting the power supply and the clock generator, and generating the first operating voltage by the power supply according to the first control signal and, generating the first clock rate by the clock generator according to the second control signal; and setting a parameter of a memory controller in a north bridge chip of the computer system via the first clock rate and the first operating voltage.

10 Claims, 3 Drawing Sheets

COMPUTER SYSTEM WITH OVERCLOCKING FUNCTION INVOLVES SETTING TIME PARAMETER OF MEMORY CONTROLLER

FIELD OF THE INVENTION

The invention relates to a computer system, more particularly, to a computer system with overclocking function.

BACKGROUND OF THE INVENTION

In general, the users can use a basic input/output system (BIOS) to control the operating voltage (CPU Vcore) or the clock rate of the computer system, which is so called a static overclocking process. Further, some of the manufacturer of the computer system provides a user interface (UI) for a user to control the operating voltage (Core) or the clock rate of the computer system, which is so called a dynamic overclocking process. Generally speaking, the whole efficiency of the computer system can be improved by increasing the operating voltage and the clock rate. However, it also consumes much power. On the contrary, the efficiency of the computer system is lowered by decreasing the operating voltage and the clock rate. However, it saves power. Thus, the users can control the computer system to keep the best efficiency according to the loading of the computer system.

In the conventional computer system, to perform the static overclocking process, the user must set the operating voltage Vcore or the clock rate in the BIOS, and the computer system must reboot after the changing the BIOS setting. When the computer system is booted, the operating voltage and the clock rate control are thus completed. However, it consumes too much time in rebooting the computer system.

Moreover, the conventional dynamic overclocking process can adjust the operating voltage (Vcore) or the clock rate of the computer system without rebooting the computer system. Thus, the problem occurred in the static overclocking process that wastes too much time can be solved. However, the clock rate adjusted by the dynamic overclocking process is just an unstable clock rate, but not an optimum clock rate. As a result, the temperature of the computer system is increased after a long time operation, the computer is unstable, and the system also may crash.

As stated above, the computer system must be rebooted in the conventional static overclocking process, and keeps the user waits for a long time. Moreover, the conventional dynamic overclocking process may make the computer system unstable. Both conventional overclocking methods are required to be improved for more efficient and more convenient.

SUMMARY OF THE INVENTION

The invention provides a computer system with an overclocking function and a method for controlling the same. The invention can complete the static overclocking process quickly and keep the stableness of the computer system after the dynamic overclocking process.

The invention provides an overclocking method in a computer system where an advance configuration and power interface (ACPI) is loaded in the computer system. The method includes steps of setting a first operating voltage and a first clock rate; generating a first control signal to a power supply and generating a second control signal to a clock generator according to the first operating voltage and the first clock rate, respectively; controlling the computer system into a sleep mode; resuming the computer system from the sleep mode after a predetermined time; restarting the power supply and the clock generator, and generating the first operating voltage by the power supply according to the first control signal and, generating the first clock rate by the clock generator according to the second control signal; and setting a parameter of a memory controller in a north bridge chip of the computer system via the first clock rate and the first operating voltage.

The invention provides an overclocking method in a computer system where an advance configuration and power interface (ACPI) is loaded in the computer system the method comprising the following steps: setting an adjusted operating voltage and an adjusted clock rate; setting a power supply to output the adjusted operating voltage via a signal path instantly and setting a clock generator to output the adjusted clock rate; controlling the computer system into a sleep mode after confirming the adjusted operating voltage and the adjusted clock rate; resuming the computer system from the sleep mode after a predetermined time; and setting a parameter of a memory controller in a north bridge chip of the computer system by the adjusted clock rate and the adjusted operating voltage.

These and other features, aspects and advantages of the present invention will become better understood with regard to the following description, appended claims, and accompanying drawings.

DETAILED DESCRIPTION OF THE PREFERRED EMBODIMENT

Figure 1:
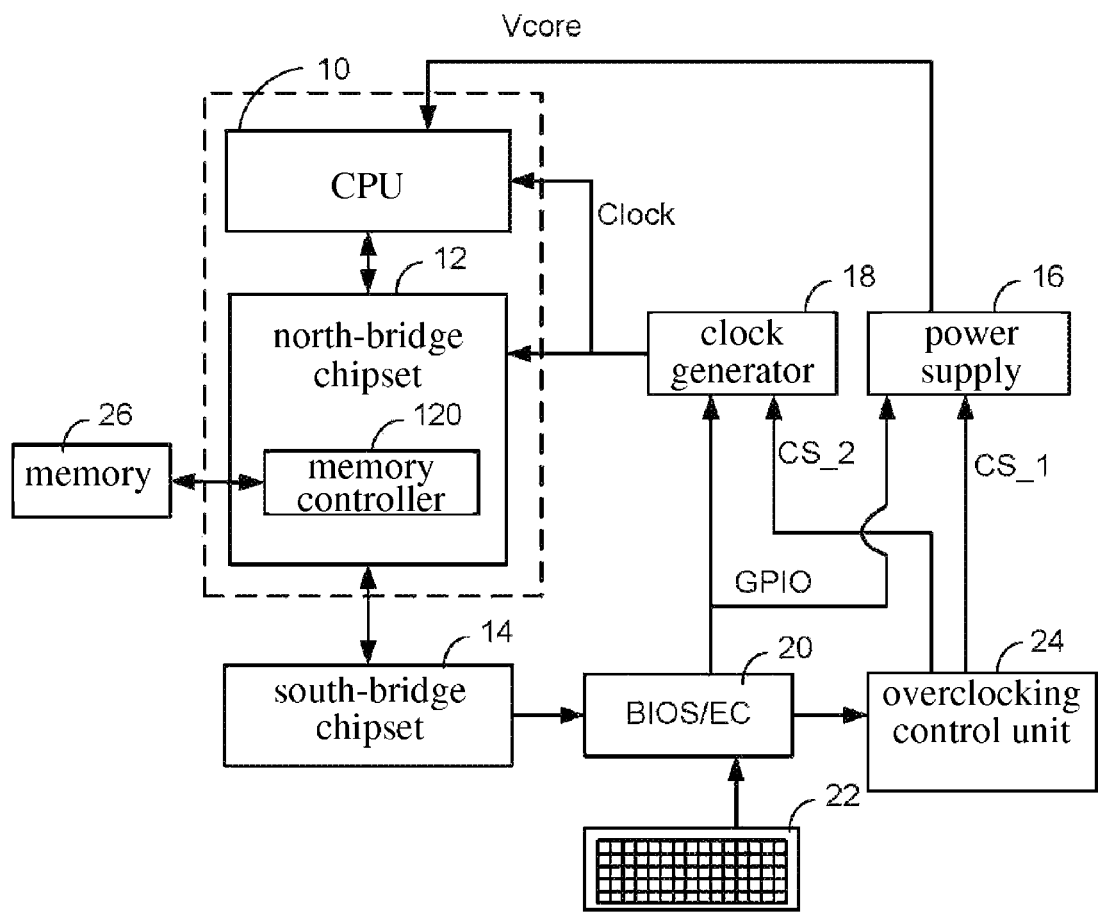
FIG. 1 is a diagram showing a computer system with a overclocking function in an embodiment of the invention.

FIG. 1 is a diagram showing a computer system with the overclocking function in an embodiment. The computer system can adjust the operating voltage (Vcore) and the clock rate of a central processing unit (CPU) and a north bridge chipset. The computer system mainly includes a CPU 10, a north bridge chipset 12, a south-bridge chipset 14, a power supply 16, a clock generator 18, a basic input/output system and embedded controller (BIOS/EC) 20, a keyboard 22, an overclocking control unit 24 and a memory 26. The north bridge chipset 12 further includes a memory controller 120 for controlling data exchanging between the north bridge chipset 12 and the memory 26. The CPU 10 and the north bridge chipset 12 can be integrated to a single chip. The power supply 16 adjusts the operating voltage (Vcore) outputted to the CPU 10 according to a first control signal CS_1. The clock generator 18 adjusts the clock rate of the CPU 10 and the north bridge chipset 12 according to a second control signal CS_2. The BIOS/EC 20 can also use a general purpose input/output (GPIO) or a system management bus (SMbus) to dynamically adjust the operating voltage (Vcore) and the clock rate of the CPU 10 and the north bridge chipset 12. The keyboard 22 may be used for enabling the dynamic overclocking process or the static overclocking process. For example, a specific hot-key is pressed to start the dynamic overclocking process or the static overclocking process. A specific button or application of the computer system also can be used for enabling the dynamic overclocking process or the static overclocking process.

Generally speaking, in the static overclocking process, the first control signal CS_1 and the second control signal CS_2 are outputted by the overclocking control unit 24 via the BIOS/EC 20.

As shown in FIG. 1, when the user wants to perform the static overclocking process on the computer system, the user touches a specific hot-key of the keyboard 22 to start the process for controlling the voltage and the clock. The keyboard 22 is used to set the setting values of the BIOS, and the EC adjusts the settings of the voltage (Vcore) and the clock according to the setting values of the BIOS, and that is, the operating voltage and the clock rate are set. When the settings of the BIOS/EC 20 are adjusted, the BIOS/EC 20 outputs the first control signal CS_1 and the second control signal CS_2 to the power supply 16 and the clock generator 18 via the overclocking control unit 24, respectively.

In the conventional static overclocking process, the user needs to reboot the computer system, and then the clock generator 18 generates an adjusted clock rate according to the second control signal CS_2, and the power supply 16 generates an adjusted operating voltage (Vcore) according to the first control signal CS_1. The main purpose to reboot the computer system is the startup procedure executed by the computer system. When the startup procedure is executed, the computer system retunes the memory controller 120 according to the adjusted operating voltage (Vcore) and the clock rate to optimize the data exchanging between the north bridge chipset 12 and the memory module 26. The memory controller 120 tunes the clock to adjust the delay time parameter of the clock to optimize the data correction. When the startup procedure is completed, and the computer system is rebooted, the control about the operating voltage and the clock rate is completed.

On the contrary, if the computer system cannot tune the memory controller 120 successfully, the data cannot be accessed between the north bridge chipset 12 and the memory 26. Consequently, the computer system fails to be rebooted, which means that the control about the operating voltage and the clock rate fails.

In the conventional dynamic overclocking process, the user may use the specific hot-key of the keyboard 22 to start the dynamic overclocking process, or use the specific button of the computer system or the application software to start the dynamic overclocking process. Then, the user adjusts the operating voltage (Vcore) and the clock rate. At that moment, the setting values of the BIOS change and the EC sets the clock generator 18 via the GPIO according to the setting value of the BIOS, to instantly change the clock rate. Similarly, the power supply 16 is set via the GPIO to instantly change the operating voltage (Vcore). Therefore, the CPU 10 and the north bridge chipset 12 can operate according to the adjusted operating voltage (Vcore) and the adjusted clock. Moreover, the BIOS/EC 20 can also use the SMbus instead of the GPIO to achieve the dynamic overclocking process.

In the conventional dynamic overclocking process, the computer system does not need to be rebooted. Thus, the user does not need to wait for a long time. However, without the rebooting step, the clock rate is not tuned by the memory controller. As a result, although the adjusted clock rate allows the north bridge chipset 12 to access the data from the memory 26 normally, the clock rate is not optimized. That is, the delay time parameter is not optimized. Thus, when the temperature of the computer system increases after a long time operation, the computer is easily unstable, or the system also may crash.

According to the BIOS firmware specification of the computer system, the computer system retunes the delay time parameter of the memory controller 120 not only after the computer system is rebooted, but also after the computer system resumes from the sleep mode (S3). When the computer system is under the sleep mode (S3), the power only supplies to the read-only memory (RAM). The computer system resuming from the sleep mode (S3) consumes less time than the computer system being rebooted. Consequently, when the computer system in the invention performs the static overclocking process on the CPU 10 and the north bridge chipset 12, the computer system resumes from the sleep mode (S3), which takes place of the conventional step in which the computer system is rebooted.

In the invention, in the process of the computer system performing the static overclocking process on the CPU 10 and the north bridge chipset 12, the computer system resumes from the sleep mode (S3), which takes place of the rebooting step of the conventional computer system, and the operating system conforming to the ACPI specification has the S3 sleep function. Consequently, the operating system loaded by the computer system of the invention should have the ACPI.

The power supply 16 and the clock generator 18 generate the adjusted operating voltage (Vcore) and the adjusted clock rate after the resuming according to the first control signal CS_1 and the second control signal CS_2, respectively. At the moment, the memory controller 120 automatically retunes the delay time parameter of the memory controller 120 according to the adjusted operating voltage and the adjusted clock. Thus, the operating voltage and the clock rate can be adjusted by controlling the S3 sleep mode of the computer system.

Moreover, when the computer system of the invention performs the static overclocking process on the CPU 10 and the north bridge chipset 12, the time for the computer system resuming from the sleep mode must be set simultaneously. As a result, the computer system automatically resumes from the sleep mode (S3) after a predetermined time, the predetermined time of the computer system may be set via a timer of the EC, and the computer system resumes from the sleep mode after the predetermined time.

Figure 2:
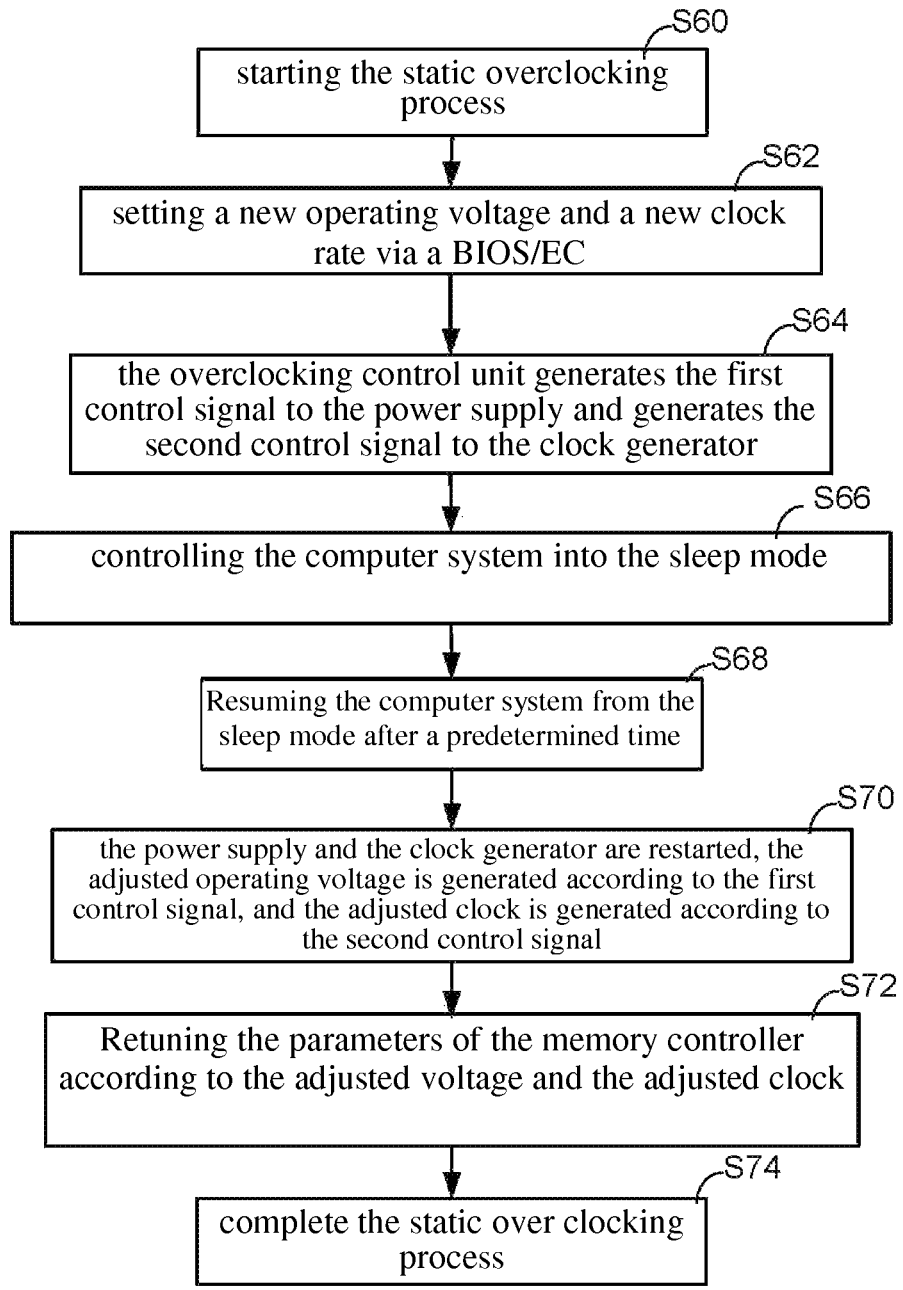
FIG. 2 is a flowchart showing a static overclocking process of a computer system in an embodiment of the invention.

FIG. 2 is a flowchart showing the overclocking method applied to a static overclocking process of a computer system in an embodiment. The process to adjust the voltage and the clock is started by using the specific hot-key, application software or a button (Step S60). The target operating voltage and the target clock rate are set via the BIOS/EC 20 (Step S62). The overclocking control unit 24 generates the first control signal CS_1 to the power supply 16 and the second control signal CS_2 to the clock generator 18 according to the BIOS/EC 20 (Step S64). Then, the operating system with ACPI is used for controlling the computer system into the sleep mode (Step S66), and after a predetermined time, such as one second, the computer system is resumed from the sleep mode (Step S68). At the moment, the power supply 16 and the adjusted clock generator 18 are restarted, the operating voltage (Vcore) is generated according to the first control signal CS_1, and the adjusted Clock is generated according to the second control signal CS_2 (Step S70). The computer system retunes the parameters of the memory controller 120 according to the adjusted operating voltage and the adjusted clock (Step S72). Finally, the static overclocking process of the computer system is completed (Step S74).

As shown in FIG. 2, according to the static overclocking process, after the user finishes setting the BIOS, the user only needs to resume the computer system from the sleep mode (S3) for a predetermined time. Consequently, the operating voltage and the clock rate can be adjusted quickly.

In the same way as described above, the overclocking method applied to the dynamic over clocking process of the computer system also includes the steps of controlling the computer system into the sleep mode (S3) and resuming from the sleep mode. As a result, the computer system retunes the parameters of the memory controller 120 according to the adjusted operating voltage and the adjusted clock. Thus, the problem occurred in the conventional dynamic overclocking process c on the CPU 10 and the north bridge chipset 12 is thus solved.

Figure 3:
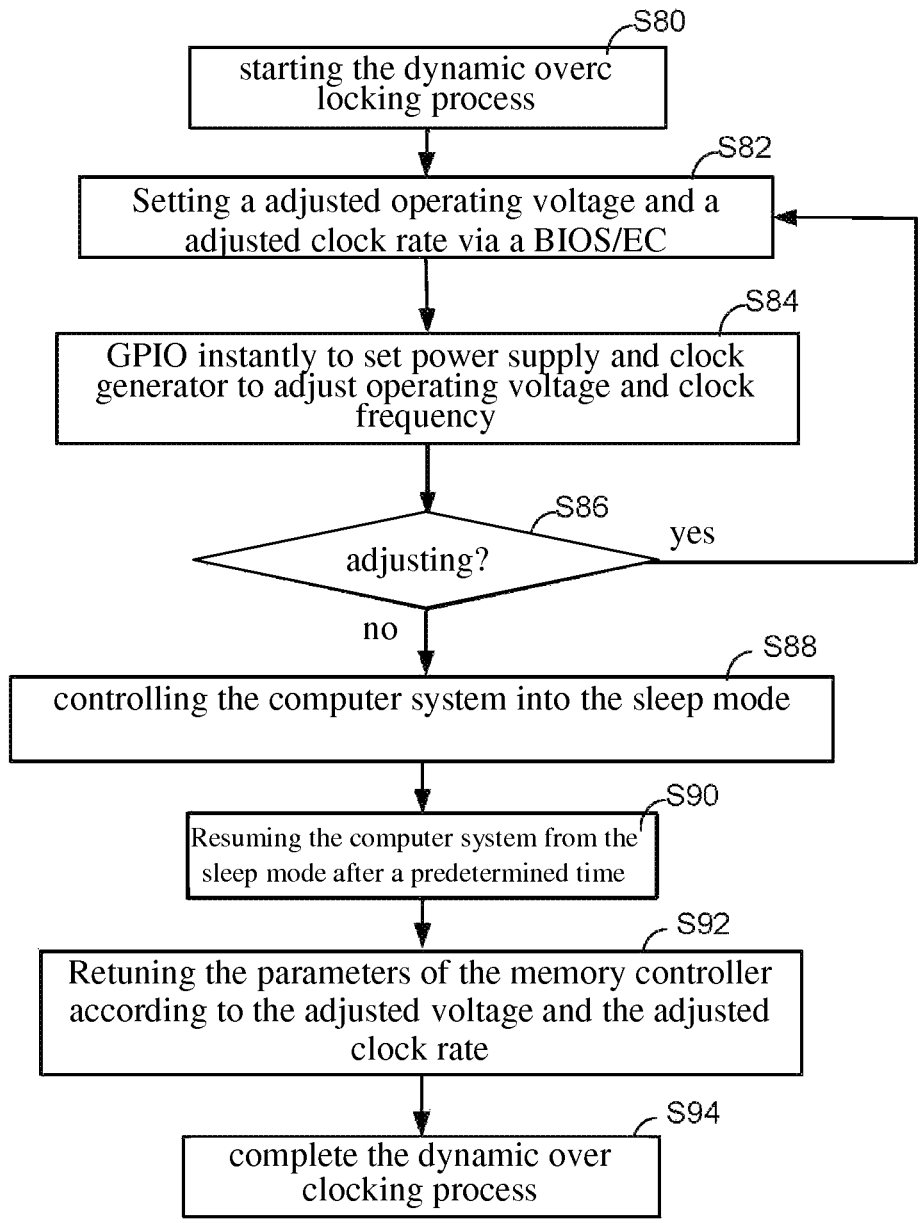
FIG. 3 is a flowchart showing a dynamic overclocking process of a computer system in an embodiment of the invention.

FIG. 3 is a flowchart showing the dynamic overclocking process of the computer system in the invention. First, the dynamic adjusting process to the voltage and the clock is started (such as using application software, a button or a hot-key to start the process) (Step S80). The user sets an adjusted operating voltage and an adjusted clock rate in the BIOS/EC (Step S82). The GPIO is used instantly to set the power supply 16, and the GPIO or the SMbus is used to set the clock generator 18 to output the adjusted operating voltage and the adjusted clock (Step S84). When the adjusted operating voltage (Vcore) and the adjusted clock rate meet the requirement of the user, the user stops the adjustment (Step S86). Then, the operating system with ACPI controls the computer system into the sleep mode (S3) (Step S88), and the computer system is resumed after a predetermined time such as one second (Step S90). The computer system uses the adjusted operating voltage (Vcore) and the adjusted clock to retune the parameters of the memory controller (Step S92). Finally, when the adjusting process for the voltage and the clock rate is completed (Step S94). If the adjusted operating voltage (Vcore) and the adjusted clock rate do not meet the user's requirement, the operating voltage and the clock rate continues to be adjusted (Step S82).

As shown in FIG. 3, since the computer system enters the sleep mode (S3) in the dynamic overclocking process, the computer system will be resumed from the sleep mode, and retuned the delay time parameter of the memory controller 120 according to the adjusted operating voltage and the adjusted clock, therefore to optimize the data exchanging between the memory controller 120 and the memory 26. Thus, the unstableness problem of the computer system can be avoided.

In conclusion, in the process of executing the overclocking process on the CPU 10 and the north bridge chipset 12 by the computer system in the invention, the steps of controlling the computer system into the sleep mode (S3) and automatically resuming from the sleep mode take place of the step of rebooting the computer system in the conventional static overclocking process. As a result, the waiting time for users is reduced. Furthermore, the steps of controlling the computer system into the sleep mode (S3) and automatically resuming from the sleep mode are included while executing the dynamic overclocking process on the CPU 10 and the north bridge chip set 12 by the computer system in the invention consume more time, however, it allows the computer system to retune the delay time parameter of the memory controller 120 according to the adjusted operating voltage and the adjusted clock after the computer system resumes from the sleep mode (S3), and thus the computer system is more stable.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. An overclocking method of a computer system, where an advance configuration and power interface (ACPI) is loaded to the computer system, the method comprising the steps:

setting a first operating voltage and a first clock rate;

generating a first control signal to a power supply and generating a second control signal to a clock generator according to the first operating voltage and the first clock rate, respectively;

controlling the computer system into a sleep mode;

resuming the computer system from the sleep mode after a predetermined time;

restarting the power supply and the clock generator, and generating the first operating voltage by the power supply according to the first control signal and, generating the first clock rate by the clock generator according to the second control signal; and setting a parameter of a memory controller in a north bridge chip of the computer system via the first clock rate and the first operating voltage.

2. The method according to claim 1, wherein the first operating voltage and the first clock rate are set via a basic input/output system (BIOS).

3. The method according to claim 1, wherein the first control signal and the second control signal are generated by an overclocking control unit.

4. The method according to claim 1, wherein an embedded controller (EC) of the computer system comprises a timer to count the predetermined time.

5. The method according to claim 1, wherein the parameter of the memory controller is a delay time parameter.

6. An overclocking method of a computer system, wherein an advance configuration and power interface (ACPI) is loaded in the computer system, the method comprising the following steps:

setting an adjusted operating voltage and an adjusted clock rate;

setting a power supply to output the adjusted operating voltage via a signal path instantly and setting a clock generator to output the adjusted clock rate;

controlling the computer system into a sleep mode after confirming the adjusted operating voltage and the adjusted clock rate;

resuming the computer system from the sleep mode after a predetermined time; and setting a parameter of a memory controller in a north bridge chip of the computer system by the adjusted clock rate and the adjusted operating voltage.

7. The method according to claim 6, wherein the adjusted operating voltage and the adjusted clock rate are set via a basic input/output system (BIOS).

8. The method according to claim 6, wherein the signal path is a system management bus (SMbus) or a general purpose input output (GPIO).

9. The method according to claim 6, wherein an embedded controller (EC) of the computer system comprises a timer to count the predetermined time.

10. The method according to claim 6, wherein the parameter of the memory controller is a delay time parameter.

* * * * *

UNITED STATES PATENT AND TRADEMARK OFFICE
CERTIFICATE OF CORRECTION

Page 1 of 1

PATENT NO.        : 8,656,150 B2
APPLICATION NO.   : 12/978829
DATED             : February 18, 2014
INVENTOR(S)       : Ren-Jiun Huang et al.

It is certified that error appears in the above-identified patent and that said Letters Patent is hereby corrected as shown below:

On the Title page of the patent grant, the item (73) Assignee's Name
"ASUSTek Computer Inc." should be changed to --ASUSTeK Computer Inc.--.

Signed and Sealed this
Third Day of June, 2014

Michelle K. Lee
*Deputy Director of the United States Patent and Trademark Office*